United States Patent [19]
Li

[11] Patent Number: 5,646,990
[45] Date of Patent: Jul. 8, 1997

[54] EFFICIENT SPEAKERPHONE ANTI-HOWLING SYSTEM

[75] Inventor: Xu Li, Cerritos, Calif.

[73] Assignee: Rockwell International Corporation, Newport Beach, Calif.

[21] Appl. No.: 531,993

[22] Filed: Sep. 21, 1995

[51] Int. Cl.⁶ .................... H04M 9/08; H04B 3/23
[52] U.S. Cl. .................. 379/390; 379/388; 379/389; 379/406; 379/410
[58] Field of Search ........................ 379/388, 389, 379/390, 406, 409, 410, 411; 370/32.1

[56] References Cited

U.S. PATENT DOCUMENTS

| | | | |
|---|---|---|---|
| 4,571,461 | 2/1986 | Uno et al. | 379/390 |
| 4,747,132 | 5/1988 | Ibaraki et al. | 379/390 |
| 4,947,425 | 8/1990 | Grizmala et al. | 379/410 |
| 5,010,570 | 4/1991 | Kobylarz et al. | 379/390 |
| 5,099,472 | 3/1992 | Townsend et al. | 370/32.1 |
| 5,193,112 | 3/1993 | Sano | 379/410 |
| 5,206,854 | 4/1993 | Betts et al. | 370/32.1 |
| 5,237,562 | 8/1993 | Fujii et al. | 379/406 X |
| 5,263,019 | 11/1993 | Chu | 379/406 X |
| 5,263,020 | 11/1993 | Yatsuzuka et al. | 379/406 X |
| 5,305,309 | 4/1994 | Chujo et al. | 379/411 X |
| 5,323,459 | 6/1994 | Hirano | 379/388 X |
| 5,495,473 | 2/1996 | Cox | 379/410 X |
| 5,526,347 | 6/1996 | Chen et al. | 379/410 X |

Primary Examiner—Krista M. Zele
Assistant Examiner—Devendra T. Kumar
Attorney, Agent, or Firm—William C. Cray; Susie H. Oh

[57] ABSTRACT

A cost-effective anti-howling system and method enables fast detection of the presence of true double talk, and substantially eliminates undesirable howling attributable to sudden changes in the acoustic echo path between a speakerphone microphone and loudspeaker during speakerphone conversations. Speakerphone embodiments include a delay-compensated and normalized cross-product calculation performed by a system processor having at least two memory buffers. One buffer is associated with the loudspeaker signal and the other buffer is associated with the microphone signal. The delay-compensated cross-product of the microphone voice signal input and the loudspeaker voice signal output is determined and normalized by energy estimates of the two signals to reduce the calculation error made by variance in the signal level.

19 Claims, 3 Drawing Sheets

EFFICIENT SPEAKERPHONE ANTI-HOWLING SYSTEM

BACKGROUND OF THE INVENTION

1. Field of the Invention

The present invention relates to speakerphone technologies and, more particularly, to a speakerphone system provided with a scheme for minimizing the effects of echo and gains introduced to allow hands-free telephone operation.

2. Description of Related Art

Speakerphones are widely used today. The ability to use a telephone set without occupying the user's hands, and also enable multiple parties to participate in the telephone call without requiring conference-type calling has been found to be a significant advantage over conventional hand-held telephone systems.

A speakerphone defines a speaker telephone which includes a microphone and a loudspeaker to enable telephone communications without a conventional telephone handset. Typically, the microphone and loudspeaker in the speakerphone are contained in the same physical structure and are thus in close proximity to each other. In many instances, however, such as in desk-top PC applications, the speakerphone electronics cannot assume that the placement of the microphone and the loudspeaker, and thus the acoustic echo path, is fixed. Thus, if the microphone is physically separable from and independently moveable relative to the loudspeaker assembly, the user may want to move the microphone relative to the loudspeaker during the conversation.

As a consequence of such close and variable proximity, speakerphones are plagued with certain problems that are inherent in the simultaneous use of the microphone and loudspeaker which comprise the speakerphone. Significant problems with speakerphone clarity and stability, e.g., disruption of the conversation due to howling, in full-duplex speakerphones are associated with acoustic coupling between the microphone and the loudspeaker. In a full-duplex system, simultaneous two-way communication is enabled where the local user can speak and listen to received speech simultaneously with the remote user. Such simultaneous conversation, however, creates acoustic feedback problems which occur when the speech received by the loudspeaker at the local end is picked up by the local microphone and directed back to the remote end. As a result, the remote party may hear a strong echo of his or her own voice. If this acoustic cycling continues, the voice quality and conversation will be distorted and significantly degraded, causing the system to become unstable, i.e., howling will occur. Of course, if the remote end user is also using a speakerphone in a back-to-back arrangement, the acoustic feedback problems are magnified.

Thus, some of the problems associated with acoustic and electrical feedback are echo, as mentioned above, howling, and gain switching, among others. For example, with regard to problems with echo, although conventional echo cancellers are generally used to reduce echo in the speakerphone performance, echo cancellation alone is not always adequate in limiting the total loop gain to less than unity to limit the positive feedback loop and, therefore, maintain system stability.

The loop gain refers to the total resultant gain of the voice signal as it passes through the various components of the speakerphone. The gain loop typically includes any speakerphone components from the microphone to the transmit channel to the remote telephone system, back through the receive channel to the loudspeaker and acoustically coupled to the microphone. Some of the major internal components of the speakerphone includes echo cancellers, such as an acoustic echo canceller (AEC) and a line echo canceller (LEC), and a voice control processor.

One type of echo canceller, e.g., an acoustic echo canceller (AEC), typically comprises a plurality of adaptive filters associated with the microphone and loudspeaker which estimate the impulse response between the microphone and loudspeaker. Another echo canceller, e.g., line echo canceller (LEC), may be implemented across the transmit and receive channels to cancel the electric reflection of signals generated by an impedance mismatch in the telephone network interface circuitry.

For each impulse response of the echo paths, an estimate of the echo is determined and subtracted from the incoming speech signal. The adaptive filters are generally included in a digital signal processing (DSP) device or other programmable processor, and are defined by a variety of algorithms that affect and determine their real-time performance, i.e., the speed necessary to converge to the echo path impulse response and accuracy of the estimation process. The algorithm coefficients are continuously adapted to represent the impulse response between the loudspeaker and microphone or the impulse response between the transmit channel and the receive channel of the network interface.

If the echo canceller impulse response accurately matches that of the echo path, the echo will be canceled. However, due to conventional device limitations, e.g., for a finite-bit resolution device, inaccuracy in coefficients exists, such that 100% cancellation can rarely, if ever, be achieved. In addition, any changes in echo path will cause the current estimated impulse response to deviate from its real one. Before the echo canceller can recognize and compensate for the change, and thus reconverge itself, a larger residue echo will be present in the system.

Moreover, in full-duplex speakerphones, AEC and LEC are typically situated adjacent each other to cancel acoustic and electrical echoes. Consequently, the AEC and the LEC must be precisely controlled so that their coefficients are adapted only in receive and transmit modes, respectively. The coefficient adaptation process is limited to receive and transmit modes because (1) the room impulse response is modeled only with the receive signal, and the local talker signal can disturb the process, and (2) the network interface impulse response is modeled only with the transmit signal, and the remote talker signal can disturb the process. Therefore, it is crucial to maintain awareness of the continuous changes in the voice signal and the system parameters.

As speakerphone use becomes more commonplace, back-to-back speakerphone system performance is of greater concern. Thus, the voice control processor must consider such arrangements to maintain complete, end-to-end speakerphone performance. Some speakerphones, however, are only directed to local speakerphones which communicate with remote handsets, rather than remote speakerphones. Accordingly, the voice control processor must be able to handle such situations.

The voice control processor is the central control of the complete speakerphone system. It should include speech detectors and loop gain control. The speech detectors determine the communication mode which, in turn, controls the adaptation process of the echo cancellers, as mentioned above. Current speech detectors, however, are not sufficiently sensitive to low level voice signals or are inadequate in speedy detection of double talk or falsely detect noise as speech. An example of such a speech detector uses a simple comparator to compare the transmit and receive signal levels and assert a detection signal if the receive level is greater than the transmit level. It is known that depending on the strength of acoustic coupling and the telephone line loss characteristics, the transmit level can be many times greater than the receive level during much of the conversation. In such cases, speech detection would thus be too slow or too late to detect the receive signal for correct channel gain adjustment. Moreover, this late decision would cause the echo canceller to drift away from its converged impulse response and lose some of the cancellation performance when it is desperately needed. This kind of speech detectors also false detect the echo path change and thus delay the echo canceller's convergence process.

As mentioned earlier, echo cancellers also cannot always maintain the optimum cancellation performance. Consequently, some gain switching must be applied to the system to maintain system stability. Furthermore, in speakerphone systems which utilize automatic gain control, the total loop gain can change abruptly due to sharp changes in the input signal. The loop gain scheme must be capable of adequately compensate for the sudden changes in the signal as well as the echo strength. Conventional speakerphone systems, however, greatly simplify the loop gain scheme to result in unnatural voice conversation, degradation of voice level, or temporal system instability.

As described above, accuracy, speed, and smoothness of gain switching are also necessary to system performance. Depending upon the desired transmit and receive signal levels, the gain can be adjusted to increase the signal level by applying a multiplier greater than one to the signal. Likewise, the signal can be decreased, or attenuated, by multiplying the signal with a gain value of less than one. The speaker device determines the optimum gain to apply to both the transmit channel and the receive channel via a variety of gain calculation algorithms.

In a full-duplex speakerphone system, typically four different conversation modes can exist. These modes may include (1) silence mode (no conversation at local or remote ends); (2) transmit mode (local user is active, remote user is silent); (3) receive mode (local user silent, remote user active); and (4) double-talk mode (simultaneous two-way local and remote communication). Due to the above-described problems of echo and howling, when switching from one communication mode to another, smooth gain switching must be applied to ensure good voice quality, as well as system stability. Without understanding the relationship between the communication mode switching and the corresponding gain switching requirement, speech clicking, syllable chopping, or transient echo may be heard as in many conventional speakerphones.

In summary, sensitive and accurate speech detection, well-designed echo cancellers, sophisticated loop gain processing, and smooth gain switching process are some of the key factors to making a fully-working full-duplex speakerphone.

SUMMARY OF THE INVENTION

Accordingly, an object of the present invention is to provide a cost-effective anti-howling system and method which enables fast detection of the presence of true double-talk and substantially eliminates undesirable howling attributable to sudden changes in the acoustic echo path between a speakerphone microphone and loudspeaker during speakerphone conversations. Embodiments of the invention practically solve system confusion caused by an increase in microphone signal level when the local speakerphone device is trying to differentiate between an actual local talker signal and echo increase attributable to strengthened acoustic coupling between the local loudspeaker and microphone assembly, such as when the microphone is moved closer to the loudspeaker.

In accordance with these and other objects, a speakerphone system in accordance with the present invention includes a delay-compensated and normalized cross-product calculation performed by a system processor having at least two memory buffers. One buffer is associated with the loudspeaker signal and the other buffer is associated with the microphone signal.

More particularly, embodiments of the present invention determine the delay-compensated cross-product of the microphone voice signal input and the loudspeaker voice signal output. The cross-product is normalized by energy estimates of the two signals to reduce the calculation error made by variance in the signal level. Since the average delay introduced by speakerphone hardware and software is generally fixed, embodiments of the present invention compensate for its delay using a preferred data addressing scheme in the loudspeaker signal buffer, which is the same buffer used in the AEC. The length of the acoustic delay, however, depends upon a variety of factors, such as the physical distance between the loudspeaker and the microphone, the room temperature, etc. Accordingly, the length of the two buffers are at least twice as long as the acoustic delay length of direct acoustic coupling from the loudspeaker to the microphone in the targeted applications.

Other objects and aspects of the invention will become apparent to those skilled in the art from the detailed description of the invention which is presented by way of example and not as a limitation of the present invention.

DETAILED DESCRIPTION OF THE PREFERRED EMBODIMENTS

The following is a description of the best presently contemplated mode of carrying out the invention. In the accompanying drawings, like numerals designate like parts of the several figures. This description is made for the purpose of illustrating the general principles of embodiments of the invention and should not be taken in a limiting sense. The scope of the invention is determined by reference to the accompanying claims.

Figure 1:
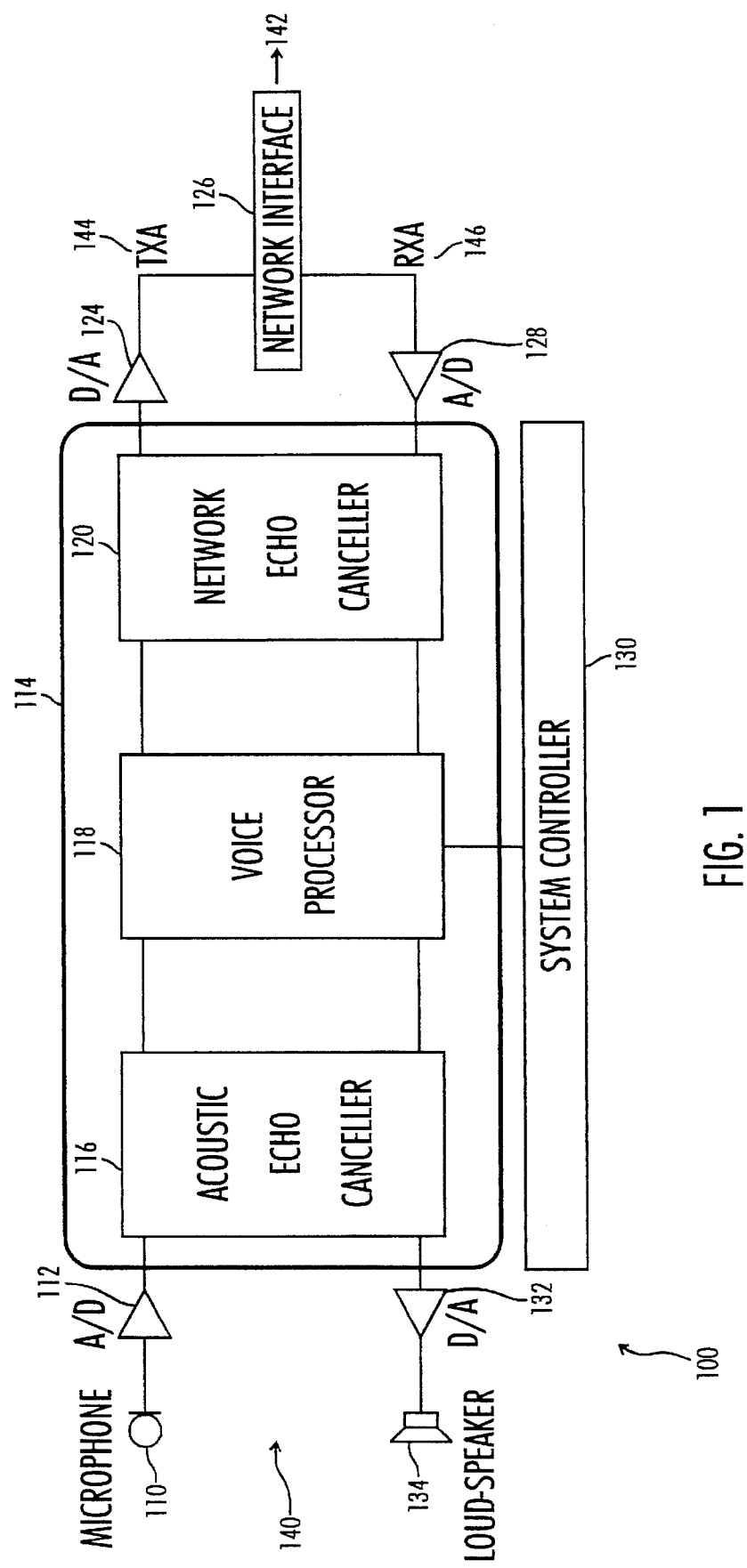
FIG. 1 is a general block diagram of a speakerphone system in accordance with preferred embodiments of the present invention.

A speakerphone system in accordance with embodiments of the present invention is indicated generally in FIG. 1. The full-duplex speakerphone is suitable for simultaneous two-way communications in which the local user at 140 may speak and listen simultaneously with the remote user 142. Preferred speakerphone embodiments include a microphone 110 to pick up the local voice signal 140, a loudspeaker 134 to allow the local user to hear the remote voice signal 142, and an analog-to-digital (A/D) converter 112 to convert the analog microphone signal into the digital domain before processing by the speakerphone electronics 114. A digital-to-analog (D/A) converter 132 is also implemented at the front end of the speakerphone electronics 114 to convert the processed remote voice signal back to analog format before broadcasting over the loudspeaker 134.

The speakerphone electronics include a variety of echo cancellers 116, 120 and a processor 118 to control the communication between the remote user 142 and the local user 140. Preferably, an acoustic echo canceller (AEC) 116 is coupled to a voice processor 118 which, in turn, is coupled to a network or line echo canceller (LEC) 120. The voice processor 118 is provided with the outputs of the AEC and the LEC on which the speech detection, loop gain controls, coefficient adaptation controls, and/or automatic signal gain controls in accordance with the present invention are performed.

As shown in FIG. 1, the speakerphone assembly may also include a system controller 130. The system controller 130 may be included as part of the speakerphone internal processor or may be implemented as an external controller. In preferred embodiments, the system controller 130 provides user interface controls and other functions available to the speakerphone assembly, such as a facsimile machine.

The speakerphone electronics 114 are coupled to a network or telephone line interface 126 via a digital-to-analog (D/A) converter 124 on the transmit line 144 and an A/D converter 128 on the receive line 146. The network interface 126 thus provides the central office telephone system interface between the local user 140 and the remote user 142.

The coupling of the loudspeaker 134 to the microphone 110 defines an acoustic path. Embodiments of the present invention overcome problems relating to howling generated by sudden acoustic path impulse response changes between the microphone 110 and loudspeaker 134. Such changes may be generated by the movement of the microphone 110 relative to the loudspeaker 134, by a sudden increase or decrease in volume setting of the loudspeaker, or by other moving objects or people that can severely change or alter the acoustic path. For example, if the microphone is physically located a substantial distance away from the loudspeaker, the acoustic coupling of the incoming and outgoing signals is negligible. However, if the microphone is moved close to the loudspeaker, strong coupling will affect the local input voice signal directed through the microphone across the transmit line.

Embodiments of the present invention thus provide for more efficient compensation for and cancellation of the effects of acoustic coupling, e.g., howling, by calculating the correlation strength between the microphone input signal and the remote voice signal broadcast by the loudspeaker, and enabling quick determination of the cause of the impulse response change, if any, which in turn allows the system processor to quickly and efficiently react and compensate for the particular type of signal change. If an echo path change is determined, the AEC coefficient adaptation will be continued to allow prompt reconvergence. If an actual local talker is detected, the AEC coefficients will be frozen, preventing the coefficients from drifting from the optimal state by the local talker signal.

Figure 2:
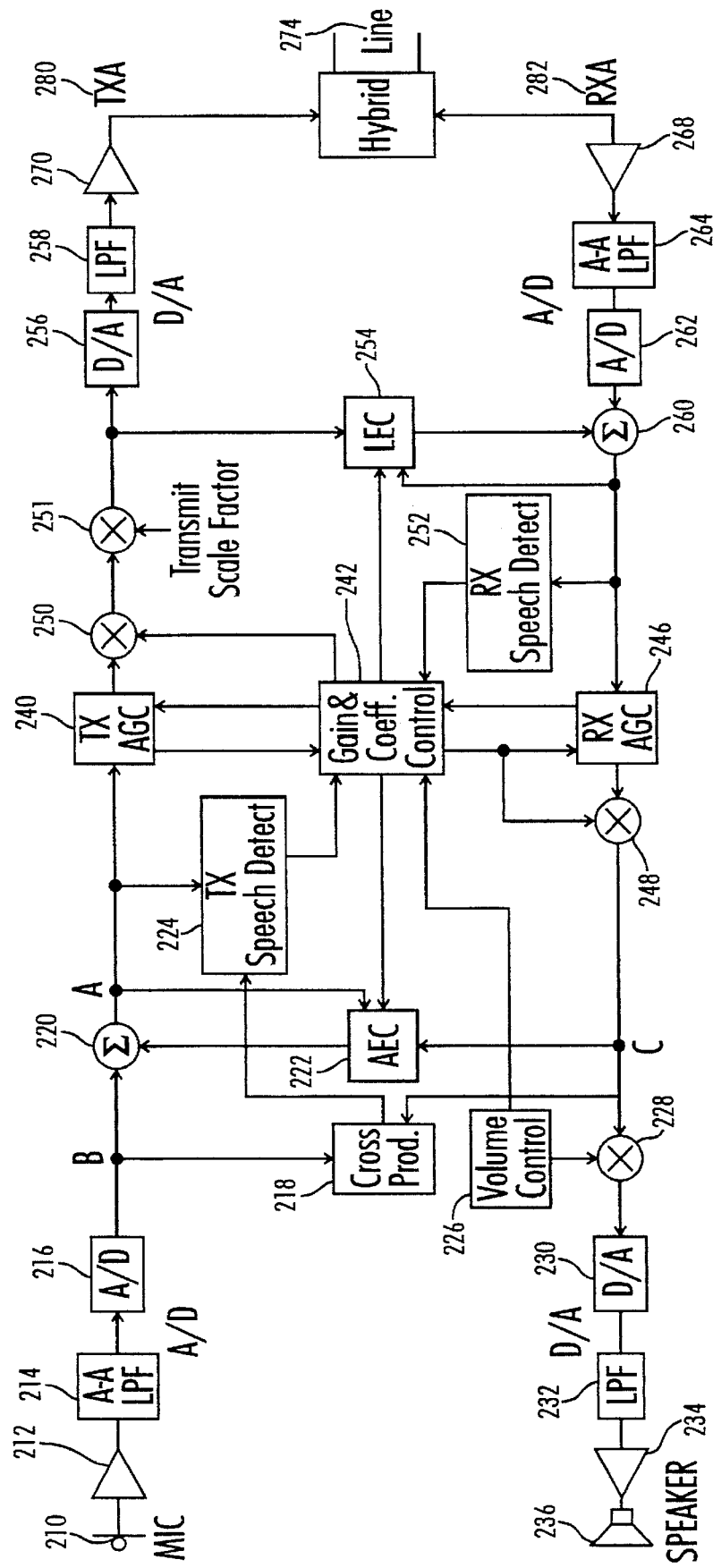
FIG. 2 is a block diagram of a speakerphone device according to preferred embodiments of the present invention.

Referring to FIG. 2, a speakerphone system implementing the antihowling scheme of the present invention is shown. According to preferred embodiments of the present invention, if the local user of the speakerphone system moves the microphone closer to the loudspeaker, the system processor 118 in FIG. 1 will not conclude that the sudden change in the microphone signal level represents a sudden burst of speech at the local end, and consequently will not cause the microphone to pick up the input erroneous signals and transmit the signals to the remote user. Rather, embodiments of the present invention are particularly directed to avoiding such retransmission of the loudspeaker broadcast, i.e., echo, back to the remote user.

As illustrated in the block diagram of FIG. 2 of the preferred embodiment of a full-duplex speakerphone, and as will be discussed in greater detail below, the transmit and receive speech detectors 224 and 252 determine the conversation modes in which the speakerphone is operating. A cross-product function 218 is implemented to assist the transmit speech detector 224 to determine if the system is in a double-talk mode, i.e., simultaneous two-way communication, as compared to simply transmitting reverberant echo. Controller 242 provides the central control which computes the loop gain of the system to maintain system stability, and directs the coefficient adaptation of the two echo cancellers AEC 222 and LEC 254. The controller 242 thus handles the transient-state gain switching, and other system control functions. In accordance with embodiments of the present invention, by efficiently enabling the transmit speech detector 224 to determine the correct conversation mode, the controller 242 can maintain the speakerphone system in an echo-free stable state.

More particularly, FIG. 2 shows a preferred speakerphone embodiment of the invention including a microphone 210 for receiving and transmitting input local voice signals (not specified). The microphone 210 is coupled to an anti-aliasing low pass filter 214 via an amplifier 212. The anti-aliasing low pass filer 214 is coupled to an A/D converter 216 which converts the input analog signals to digital format. The digital transmit signal at Node B is then directed to the cross-product box 218, where it is compared to the digital receive signal sent from the remote telephone system (not shown) across the receive channel 282 of the line interface 274.

The output of the cross-product box 218, which will be described in more detail below, is directed to the transmit speech detector 224, together with the local signal which has been decreased with the output of the AEC 222 at Node A. The AEC 222 is provided to cancel the feedback echo attributable to the combination of signals at Node B. If the output of the cross-product box 218 is greater than a predetermined threshold, the controller 242 will determine that there is only one originating signal at Node C echoing in the room. Accordingly, a double-talk mode will not be asserted, and the controller 242 will continue to allow AEC 222 to adjust its coefficients to track the acoustic impulse response.

In preferred embodiments, the controller 242 provides gain determinations and coefficient adaptation controls, and acts as the primary system decision-maker. As can be seen in FIG. 2, controller 242 gathers a plurality of data lines and provides appropriate control instructions to other components of the speakerphone system. For example, the controller 242 receives data from the transmit and receive AGC systems 240 and 246, and thus can respond to the particular AGC settings. The controller 242 also receives information pertaining to the volume controller 226 which indicates the volume setting of the loudspeaker 236. When the volume setting is changed, the AEC 222 coefficients can be scaled according to the change. Therefore, the AEC is instantly adjusted to the change in loudspeaker volume.

In addition, the controller 242 receives detection information from the transmit and receive detectors 224 and 252, and can determine the correct communication mode, i.e., (1) silence mode; (2) transmit mode; (3) receive mode; and (4) double-talk mode, and is able to gauge the proper performance of the echo cancellers AEC 222 and LEC 254. With the information as to the performance of the echo cancellers, the controller 242 can determine the type of gain switching and how much gain, at what speed, should be applied at multipliers 250, 251, 248, or 228 to correctly switch the communication to the desired conversation mode. Consequently, the controller 242 can direct which adaptive filter coefficients of either the AEC 222 or LEC 254 should be adjusted or fixed as necessary to cancel or attenuate the undesired echo.

Thus, after gain values are applied at 250 and 251 to the local microphone voice signal, the signal is directed to a D/A converter 256 and another low pass filter 258, amplified in hardware at 270 if necessary, and transmitted across the transmit channel 280 to the hybrid line interface 274 to be transmitted across the network line to the remote user. Concurrently, the remote analog voice signal is received at the receive channel 282 and input into amplifier 268 before being filtered at anti-aliasing filter 264 and converted by A/D converter 262 and summed at 260 with the output of the LEC 254. The resultant remote voice signal is then directed into the receive AGC 246, speech detector 252 and also fed back into the LEC 254 to be used in coefficient adaptation. Ultimately, gain factors are applied at 248 and 228 to the remote voice signal, which is then passed through D/A converter 230, filter 232, and amplifier 234, before being output at the loudspeaker 236.

Figure 3:
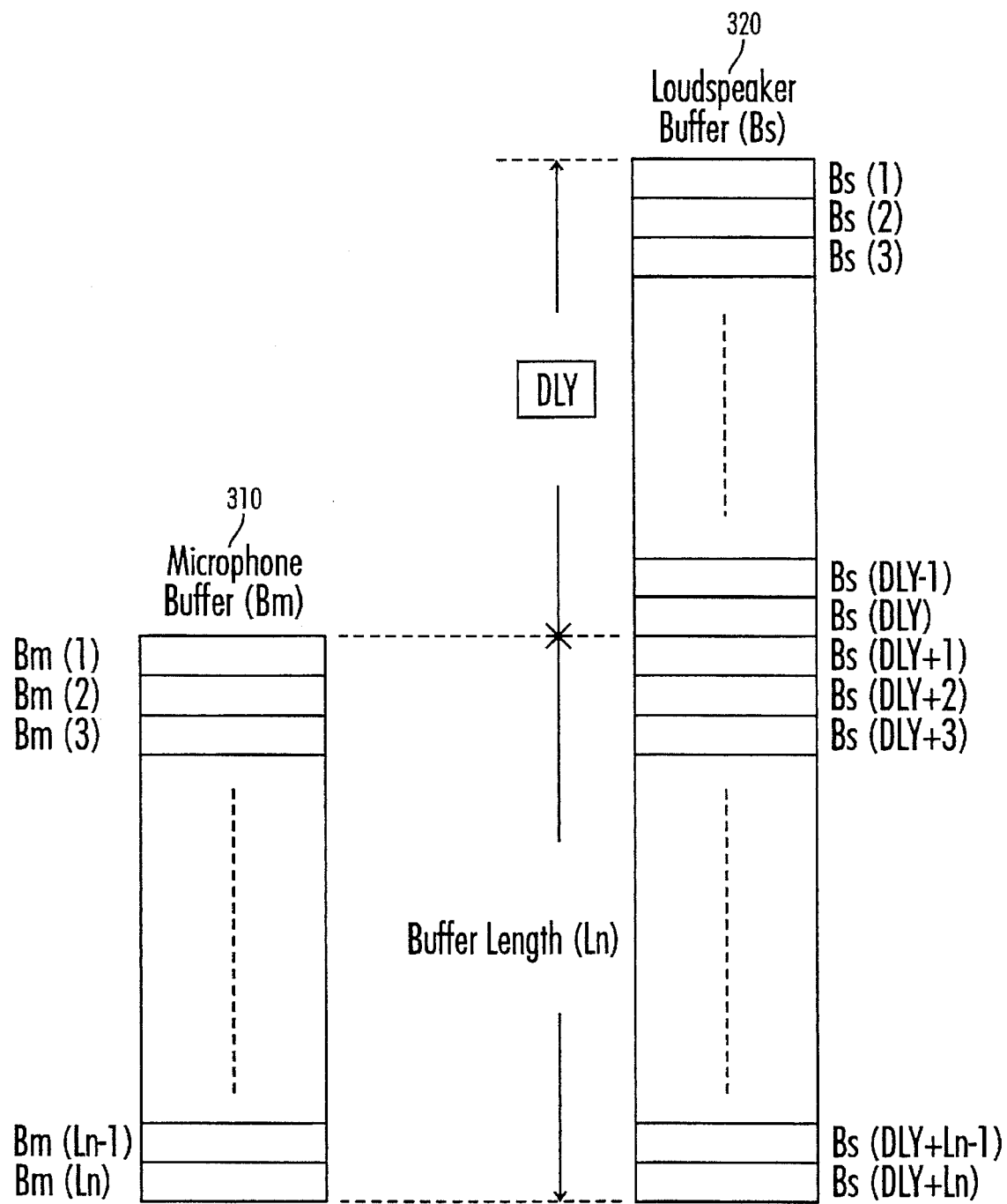
FIG. 3 shows the loudspeaker data buffer and microphone data buffer arrangement of the cross product component indicated in FIG. 2.

Referring back to the cross-product box 218, the cross-product function also estimates the local voice signal energy level at Node B and the remote voice signal energy level at Node C. The signal energies are calculated as integrations of their representative voice signals with the integration window aligned with a buffer length Ln. (FIG. 3) Based on the average fixed delay (DLY) from the remote signal at Node C relative to the signal which is ultimately output by the loudspeaker 236 plus the delay from the microphone 210 to the signal at Note B, the cross-product (convolution) is executed between data in a microphone signal buffer Bm 310 and loudspeaker signal buffer Bs 320 starting after DLY number of samples as shown in FIG. 3, with Bm(1) and Bs(1) being the newest data in its buffer. Since the hardware delay is fixed and known, i.e., that of the converters and filters, etc., and because the software processing delay is also a known quantity which merely depends upon the software coding scheme, the only delay essential to the accuracy of the cross-product calculation is the acoustic path delay which is inherent in this test for speakerphone applications.

The data at Node C is buffered in a number of continuous memory locations (DLY+Ln) and the data arriving at Node B is stored in Ln-address memory locations, as illustrated in FIG. 3. As described above, DLY refers to the fixed delay of the signal passing through the hardware and the software. Ln refers to the microphone signal buffer length. The cross-product is thus calculated according to the equation:

$$\text{Crossprod} = \frac{\sum_{n=1}^{Ln} [B_m(n) * B_s(n + DLY)]}{\overline{E}_m * \overline{E}_s}$$

where $\overline{E}_m$ and $\overline{E}_s$, represent the energy estimates at Nodes B and C, respectively, and are calculated recursively. In each sample period, the following equations are executed and the data are shifted down in the buffers by one sample after the cross-product calculation is completed:

$$\overline{E}_m = \left(1 - \frac{1}{Ln}\right) * \overline{E}_m + \left(\frac{1}{Ln}\right) * |Bm(1)|$$

$$\overline{E}_s = \left(1 - \frac{1}{Ln}\right) * \overline{E}_s + \left(\frac{1}{Ln}\right) * |Bs(DLY+1)|$$

To minimize the fixed delay effects in the result, and thus incorporate the fixed delay in the convolution equation, the DLY sample block buffered in buffer Bs is discounted. For example, if there is a ten sample delay in the room front-end hardware and software, data addresses 1 to 160 are used in buffer Bm, then addresses 11 to 170 should be taken from buffer Bs. The convolution of the data in buffers Bm and Bs is then normalized by dividing the energy estimates of the signals at Nodes B and C. The resultant value is the delay-compensated and normalized cross-product.

As explained above, the output of the cross-product box 218 is input into the transmit speech detector 224, which determines if the cross-product represents a moving microphone or speaker, or an active local talker. Thus, when the local user moves the microphone close to the speaker, preferred embodiments of the speakerphone system will detect an increase in the calculated cross-product. That is, if there is no local active talker, but the microphone signal level suddenly changes, the cross-product value will be high, indicating that the microphone or loudspeaker has been moved. In contrast, if the cross-product value is low, the system will conclude that the signals at Node C and Node B are not closely correlated, and that any sudden changes in the microphone signal level represent the presence of an active local talker.

It will be recognized that other loudspeaker to microphone impulse response changes are possible which could also indicate sudden changes in the microphone signal level such as someone walking into the room where the speakerphone is situated, thereby changing the acoustic path between the microphone and loudspeaker. A sudden change in the loudspeaker volume could also affect the cross-product determination. More simply, the cross-product determination of the present invention enables a quick and efficient determination as to whether only one active signal is present at the local end, or if there is a second, unrelated signal.

This detailed description is set forth only for purposes of illustrating examples of the present invention and should not be considered to limit the scope thereof in any way. It is recognized that numerous additions, substitutions, and other modifications can be made to the invention without departing from the scope of the invention which is defined in the appended claims and equivalents thereof.

What is claimed is:

1. A system for identifying and canceling the effects of acoustic coupling during telephone communications between a local user and a remote user, wherein transmit signals are input by the local user and receive signals are input by the remote user, the system comprising:

a first transducer for transmitting the transmit signals;

a second transducer situated near the first transducer for receiving and broadcasting the receive signals, wherein the proximity of the second transducer to the first transducer causes acoustic coupling having associated echo;

communication means for carrying the transmit and receive signals, the transmit and receive signals having representative transmit samples and receive samples, and transmit and receive signal energies, wherein the communication means includes a first node which receives the transmit samples, and a second node which receives the receive samples, wherein the communication means determines a delay from when the receive samples are received at the second node to when the receive samples are broadcast by the second transducer, and from when the transmit samples are input by the local user to when the transmit samples are received at the first node;

correlation means for determining if the transmit samples received at the first node and the receive samples received at the second node are substantially correlated, the correlation means providing correlation information; and a processor for processing the correlation information, such that if the correlation is high between the transmit samples and the receive samples, the processor determines that the transmit samples are similar to the receive samples and thus represent echo, and if the correlation is low, the processor concludes that the transmit samples represent input transmit signals from the local user.

2. The system of claim 1, further comprising means for canceling any howling attributable to transmit signal changes.

3. The system of claim 1, wherein the correlation means comprises a cross-product calculator in which a predetermined number of transmit samples and a predetermined number of receive samples, which are determined following the delay, are processed in conjunction with their respective transmit and receive signal energies to generate a cross-product value, further wherein the processor, processes the cross-product value to assist in determining the similarity between the transmit samples and the receive samples.

4. The speakerphone system of claim 3, wherein if the cross-product value is high and them is change in the transmit signal energy, the processor will determine that the change in the transmit signals is caused by movement of the microphone relative to the second transducer, and if the cross-product value is low, the processor will determine that the change in the transmit signals is caused by transmit signals being input by the local user.

5. A speakerphone system for canceling the effects of acoustic coupling during speakerphone communications between a local user and a remote user, wherein transmit signals are input by the local user and receive signals are input by the remote user, the system comprising:

a microphone for transmitting the transmit signals;

a loudspeaker situated near the microphone for receiving and broadcasting the receive signals, wherein the proximity of the loudspeaker to the microphone causes acoustic coupling having associated echo, further wherein the receive signals and transmit signals have an associated impulse response;

an echo canceller coupled to the microphone and loudspeaker;

at least one communication channel across which the transmit signals and the receive signals are directed, the transmit and receive signals having representative transmit samples Bm and receive samples Bs, and transmit and receive signal energies, respectively, the at least one communication channel including a Node B which receives the transmit samples and a Node C which receives the receive samples, wherein the speakerphone system has a first delay from when the receive samples are received at Node C to when the receive samples are broadcast by the loudspeaker, and a second delay defined between when the transmit samples are input by the local user to when the transmit samples are received at Node B, further wherein the first delay added to the second delay is called DLY;

a microphone buffer for storing transmit samples $Bm(1)$ to $Bm(Ln)$, where $Bm(1)$ represents a first transmit sample stored in the microphone buffer, and $Bm(Ln)$ represents transmit sample Ln stored in the microphone buffer;

a loudspeaker buffer for storing receive samples $Bs(1)$ to $Bs(DLY+Ln)$, where $Bs(1)$ represents a first sample stored in the loudspeaker buffer, and $Bs(DLY+Ln)$ represents transmit sample DLY+Ln stored in the loudspeaker buffer;

means for applying a cross-product function to the stored transmit and receive samples according to the equation:

$$\text{Crossprod} = \frac{\sum_{n=1}^{Ln} [B_m(n) * B_s(n + DLY)]}{\overline{E_m} * \overline{E_s}},$$

where $\overline{E}_m$ and $\overline{E}_s$ represent the energies of the transmit and receive signals at Nodes B and C, respectively, wherein the means for applying a cross-product function has a cross-product output;

a speech detector for receiving the cross-product output; and a controller coupled to the speech detector for processing the cross-product output relative to the transmit and receive signals to recognize changes in the transmit signals relative to the receive signals, and for determining whether the changes in the transmit signals are attributable to changes in acoustic coupling or to new transmit signals input into the microphone by the local user.

6. The speakerphone system of claim 5, wherein the echo canceller comprises an adaptive filter having corresponding filter coefficients which are adapted in accordance with the impulse response of the transmit and receive signals.

7. The speakerphone system of claim 6, wherein the communications between the local user and the remote user switch between a plurality of communication modes.

8. The speakerphone system of claim 7, wherein if the controller determines that the transmit signal changes are caused by acoustic coupling, the echo canceller will continue to adapt the filter coefficients and the communication mode is not switched.

9. The speakerphone system of claim 5, wherein if the cross-product output is high and the transmit signal energy suddenly changes, the controller will determine that the change in the transmit signals is caused by movement of the microphone relative to the loudspeaker, and if the cross-product output is low, the controller will determine that the change in the transmit signals is caused by transmit signals being input by the local user.

10. The speakerphone system of claim 5, further comprising energy estimation means for estimating the transmit and receive signal energies, wherein sample periods are defined for each transmit and receive sample, further wherein for each sample period, new energy estimates are determined according to:

$$\bar{E}_m = \left(1 - \frac{1}{Ln}\right) * \bar{E}_m + \left(\frac{1}{Ln}\right) * |Bm(1)|$$

$$\bar{E}_s = \left(1 - \frac{1}{Ln}\right) * \bar{E}_s + \left(\frac{1}{Ln}\right) * |Bs(DLY+1)|.$$

11. The speakerphone system of claim 5, wherein the receive samples Bs(1) to Bs(DLY) stored in the loudspeaker buffer are not used in the cross-product function.

12. A speakerphone system for canceling undesirable system howling between a local user using a local speakerphone system and a remote user, wherein local transmit signals are transmitted by the local user to the remote user, and remote receive signals are transmitted by the remote user to the local user, the speakerphone system comprising:

a microphone for transmitting the transmit signals to the remote user;

a loudspeaker for receiving and broadcasting the receive signals, the loudspeaker being acoustically coupled to the microphone, wherein the coupling of the microphone and loudspeaker defines an acoustic impulse response when broadcast receive signals are received and retransmitted by the microphone, the retransmitted signals representing echo;

speakerphone electronics coupled to the microphone including a processor for processing the transmit and receive signals, the processor comprising:

means for distinguishing the transmit signals from the broadcast receive signals, means for calculating a delay between the broadcast receive signals and the echo of the broadcast receive signals; and processor means for identifying changes in the acoustic impulse response between the microphone and loudspeaker, including correlation means for determining the correlation of the transmit signals and the receive signals, accounting for the calculated delay, wherein if the correlation means determines that the transmit signals and the receive signals are substantially correlated, the means for identifying will determine that the change in the acoustic impulse response is attributable to echo.

13. The system of claim 12, further comprising means for canceling the echo.

14. The system of claim 13, wherein the means for canceling the echo comprises an acoustic echo canceller (AEC) for detecting rebroadcast echo and for receiving the receive signals, such that the echo is canceled from the transmit signals.

15. A method of canceling the effects of acoustic coupling during telephone communications between a local user and a remote user, wherein transmit signals are input by the local user and receive signals are input by the remote user, the method comprising the steps of:

receiving the transmit signals and transmitting the transmit signals to the remote user;

receiving and broadcasting the receive signals, wherein acoustic coupling having associated echo is generated when transmit signals and receive signals are received simultaneously;

identifying representative transmit samples and receive samples among the transmit and receive signals, respectively;

receiving the transmit samples at a first node and the receive samples at a second node;

determining a delay including the time from when the receive samples are received at the second node to when the receive samples are broadcast, and the time from when the transmit samples are input to when the transmit samples are received at the first node;

estimating transmit and receive signal energies;

correlating the transmit samples received at the first node and the receive samples received at the second node to provide correlation information; and processing the correlation information with a processor, such that if the correlation information indicates that the correlation is high between the transmit samples and the receive samples, the transmit samples are determined to be similar to the receive samples and thus represent echo, and if the correlation is low, the processor concludes that the transmit samples represent input transmit signals from the local user.

16. The system of claim 15, further comprising the step of preventing transmission of echo.

17. The system of claim 15, wherein the step of correlating comprises the steps of:

calculating a cross-product in which a predetermined number of transmit samples and a predetermined number of receive samples, which are determined following the defined delay, are processed in conjunction with their respective estimated transmit and receive signal energies to generate a cross-product value; and processing the cross-product value to determine whether a change in the transmit signals is attributable to a sudden input of transmit signals by the local user, whereupon the transmit signals are not determined to be howling.

18. A system for identifying and canceling the effects of acoustic coupling during telephone communications between a local user and a remote user, wherein transmit signals are input by the local user and receive signals are input by the remote user, the system comprising:

a first transducer for transmitting the transmit signals;

a second transducer situated near the first transducer for receiving and broadcasting the receive signals, wherein the proximity of the second transducer to the first transducer causes acoustic coupling having associated echo;

communication means for carrying the transmit and receive signals, the transmit and receive signals having representative transmit samples and receive samples, and transmit and receive signal energies, wherein the communication means includes a first node which receives the transmit samples, and a second node which receives the receive samples;

correlation means for calculating a cross-product in which a predetermined number of transmit and receive signal samples are processed in conjunction with their respective transmit and receive signal energies to generate a cross-product value to determine if the transmit samples received at the first node and the receive samples received at the second node are substantially correlated, the correlation means providing correlation information; and a processor for processing the correlation information, such that if the correlation is high between the transmit samples and the receive samples, the processor determines that the transmit samples are similar to the receive samples and thus represent echo, and if the correlation is low, the processor concludes that the transmit samples represent input transmit signals from the local user, wherein if the cross-product value is high and there is change in the transmit signal energy, the processor will determine that the change in the transmit signals is caused by movement of the first transducer relative to the second transducer, and if the cross-product value is low the processor will determine that the change in the transmit signals is caused by transmit signals being input by the local user.

19. A method of canceling the effects of acoustic coupling during telephone communications between a local user and a remote user, wherein transmit signals are input by the local user and receive signals are input by the remote user, the method comprising the steps of:

receiving the transmit signals and transmitting the transmit signals to the remote user;

receiving and broadcasting the receive signals, wherein acoustic coupling having associated echo is generated when transmit signals and receive signals are received simultaneously;

identifying representative transmit samples and receive samples among the transmit and receive signals, respectively;

receiving the transmit samples at a first node and the receive samples at a second node;

estimating transmit and receive signal energies;

calculating a cross-product in which predetermined numbers of transmit and receive samples are processed in conjunction with their respective estimated transmit and receive signal energies to generate a cross-product value which represents correlation information; and processing the correlation information with a processor, such that if the correlation information indicates that the correlation is high between the transmit samples and the receive samples, the transmit samples are determined to be similar to the receive samples and thus represent echo, and if the correlation is low, the processor concludes that the transmit samples represent input transmit signals from the local user, wherein if the cross-product value is high and there is change Ln the transmit signal energy, the processor will determine that the change in the transmit signals is caused by movement of a first transducer relative to a second transducer, and if the cross-product value is low, the processor will determine that the change in the transmit signals is caused by transmit signals being input by the local user.

* * * * *